United States Patent [19]
Suzuki et al.

[11] Patent Number: 5,298,928
[45] Date of Patent: Mar. 29, 1994

[54] WATERPROOF CAMERA

[75] Inventors: Tatsuya Suzuki; Shunji Matsutani, both of Tokyo, Japan

[73] Assignee: Olympus Optical Co., Ltd., Tokyo, Japan

[21] Appl. No.: 922,050

[22] Filed: Jul. 29, 1992

[30] Foreign Application Priority Data

Aug. 2, 1991 [JP] Japan .................. 3-194456

[51] Int. Cl.⁵ .................. G03B 17/08; G03B 17/04
[52] U.S. Cl. .................. 354/64; 354/187
[58] Field of Search .................. 354/64, 195.1, 195.12, 354/187, 283

[56] References Cited

U.S. PATENT DOCUMENTS

| | | | |
|---|---|---|---|
| 4,244,591 | 1/1981 | Umetsu | 354/266 |
| 4,763,145 | 8/1988 | Takamura et al. | 354/64 |
| 4,908,650 | 3/1990 | Taniguchi et al. | 354/64 |
| 4,931,816 | 6/1990 | Kamo et al. | 354/64 |
| 5,070,348 | 12/1991 | Kayakawa et al. | 354/64 |
| 5,153,622 | 10/1992 | Hayakawa et al. | 354/64 |

FOREIGN PATENT DOCUMENTS 2246025 10/1987 Japan .
113137 1/1988 Japan .
62330 3/1991 Japan .

*Primary Examiner*—Michael L. Gellner
*Assistant Examiner*—Nicholas J. Tuccillo
*Attorney, Agent, or Firm*—Louis Weinstein

[57] ABSTRACT

Disclosed is a waterproof camera in which a watertightness of an interior of a camera body or a lens tube is maintained during a state where zooming is not performed by a zooming knob defined as a zooming manipulation member. When the lens tube is advanced and retracted by zooming, although the zooming knob is manipulated, a gap serving as an air hole is formed with this manipulation, and the interior of the camera body or the lens tube communicates with the outside air. This prevents such a state that a drive resistance of the lens tube increases. The camera does not require a special filter or the like as provided in the prior art waterproof camera, the filter being disposed in the gap serving as the air hole.

25 Claims, 6 Drawing Sheets

WATERPROOF CAMERA

BACKGROUND OF THE INVENTION

1. Field of the Invention

The present invention relates to a waterproof camera of a daily-use water resistant type which incorporates a lens tube advancing and retracting apparatus in the direction of an optical-axis.

2. Related Background Art

In the daily-use water resistant type of conventional camera having a photographing lens tube which advances and retracts, the camera is kept in a watertight state. Hence, an internal volume of the watertight camera changes with the advancing and retracting movements based on a zooming drive of the photographing lens tube and a collapsible driving action thereof, and an internal pressure is thereby varied. A resistance force during the drive of the lens tube largely changes due to the variation in the internal pressure thereof. Besides, there exists a possibility in which the internal pressure becomes negative with respect to the outside air, and the watertightness can not be kept. To cope with this, according to a drip-proof camera disclosed in Japanese Utility Model Laid-Open Publication No. 113137/1988, a breeze hole is formed in a main frame of the camera having the advanceable/retractable photographing lens tube, and a filter composed of a non-water-permeable but air-permeable material (e.g., GORE TEX (brand name) made by JAPAN CORE TEX Corp.) is disposed therein. The above-mentioned inconvenience is thus eliminated.

However, the above-stated drip-proof camera disclosed in Japanese Utility Model Laid-Open Publication No. 113137/1988 involves the use of the filter of the expensive material exhibiting both the non-water-permeability and air-permeability. This is disadvantageous in terms of cost. An additional inconvenience is such that because of using the above-mentioned filter, the water droplets which have mistakenly entered the camera during an exchange of the film can not be discharged from the camera and therefore remain inside.

SUMMARY OF THE INVENTION

It is a general object of the present invention, which has been devised to obviate the inconveniences described above, to provide an inexpensive waterproof camera with a smaller amount of fluctuations in load of a lens tube drive for holding the watertightness without requiring the use of the above-mentioned special filter in a daily-use water resistant type of camera having a advanceable/retractable photographing lens tube.

Then, in the typical camera, an internal volume of the camera body varies with the advancement and retraction of the lens tube. However, the advancement and retraction thereof are performed when manipulating a zoom button or zoom knob during zooming, a shutter release button during focusing and a telephoto/wide-angle changeover button during a telephoto/wide-angle changeover. The manipulation member is manipulated invariably when making the advancement and retraction. Hence, in the waterproof camera according to the present invention, the air hole is formed in connection with the manipulation of the manipulation member or when the necessity for the volumetric change of the camera body arises. The daily-use water resistant function is thus satisfied.

Other characteristics and advantages of the present invention will become sufficiently apparent during the following discussion.

DETAILED DESCRIPTION OF THE PREFERRED EMBODIMENTS

Illustrative embodiments of the present invention will be described.

Figure 1:
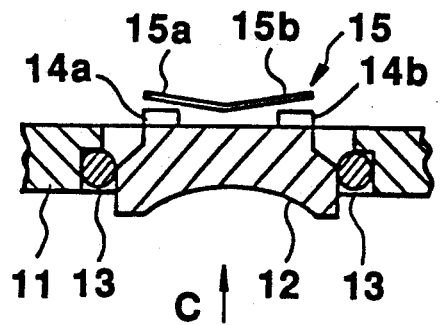
FIG. 1 is a vertical sectional view showing a non-manipulating state of a manipulation button of a waterproof camera in a first embodiment of the present invention.
Figure 2:
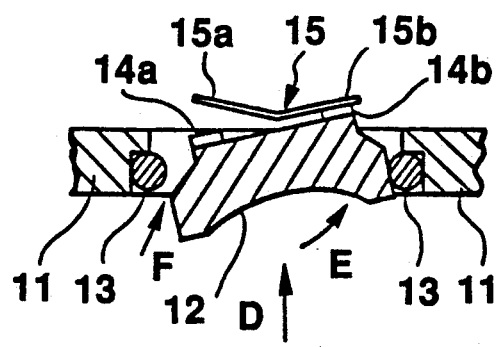
FIG. 2 is a vertical sectional view illustrating a manipulating state of the manipulation button of the waterproof camera of FIG. 1.
Figure 3:
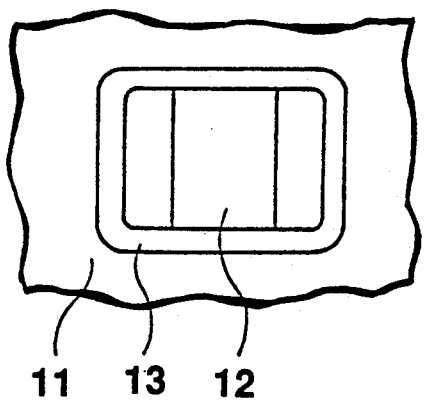
FIG. 3 is a view taken substantially in the direction of arrow C of FIG. 1.
Figure 4:
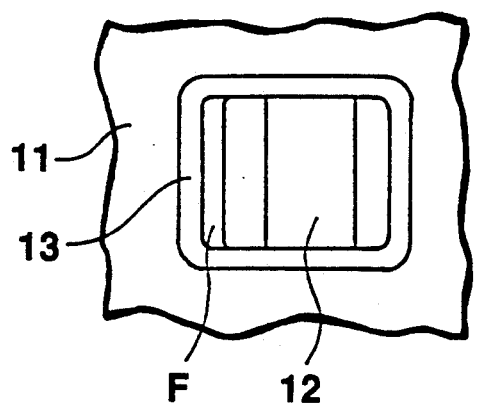
FIG. 4 is a view taken substantially in the direction of arrow D of FIG. 2.

FIGS. 1 and 2 are sectional views of a zoom knob for zooming of a waterproof camera, showing a first embodiment of the present invention. FIG. 1 is a sectional view illustrating a non-manipulating state. FIG. 2 is a sectional view illustrating a manipulating state. Further, FIG. 3 is a view taken substantially in the direction of arrow C of FIG. 1. FIG. 4 is a view taken in the direction of arrow D. The waterproof camera in this embodiment is constructed so that a watertightness of an interior of a camera body or an unillustrated lens tube is kept generally in a non-zooming state. Then, when the lens tube is advanced and retracted by zooming, a zooming knob 12 serving as a manipulation member is manipulated. However, a gap F which will become an air hole is formed with this manipulation. The interior of the camera body or the lens tube communicates with the outside air.

Figure 5:
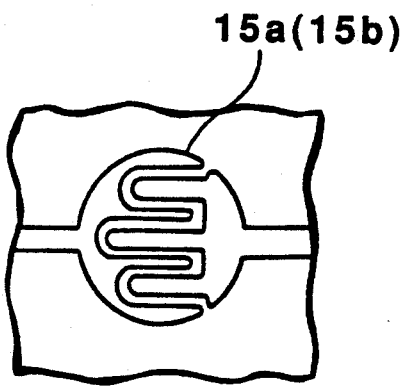
FIG. 5 is a diagram depicting a switch pattern of a flexible printed board of the manipulation button of the waterproof camera of FIG. 1.

As depicted ion FIG. 1, the zoom knob 12 which is supported on the camera body 11 in a see-saw driven state has connecting portions sealed with drip-proof O-rings 13. The zoom knob 12 is biased and held in a non-manipulating neutral position by an unillustrated spring during the non-manipulation. Contact points 14a, 14b each composed of a conductive rubber are provided on the knob 12 inwardly of the camera body 11. Disposed in positions opposite to the contact points 14a, 14b are conductor patterns 15a, 15b (see FIG. 5) of a zoom indicative switch of a switch-oriented flexible printed board 15 slightly spaced in the neutral positioning state of the knob 12. The watertight state of the camera body interior is thus maintained during the non-manipulation of the knob 12.

Then, when effecting the zooming, as illustrated in FIG. 2, the zooming knob 12 is pushed down in a direction E for giving a zooming indication. The contact point 14b contacts the switch pattern 15b, thereby outputting a zoom indication signal. Subsequently, the lens tube moves to a predetermined position. At this moment, the gap F serving as the air hole is formed in the side surface of the knob 12, whereby the interior of the camera body 1 communicates with the outside air. The air flows in and out of the gap F concomitantly with the movement of the lens tube. Fluctuations in internal pressure of the camera body or the lens tube can be thereby restrained. This in turn avoids an increase in load during the zooming drive. Then, when the knob 12 is returned to the original position, the zooming is stopped, and, simultaneously, the watertightness is kept.

As described above, the waterproof camera in this embodiment does not require the use of a filter or the like made of an expensive material exhibiting a non-water-permeability and an air-permeability as in the case of a conventional waterproof camera. The watertightness is normally kept, and the gap F serving as the air hole is formed only when indicating the zooming operation. A change in the internal pressure of the camera body is thus prevented. Besides, an advantage is provided, wherein the water droplets which have mistakenly entered the camera are dischargeable from the gap F.

Figure 6:
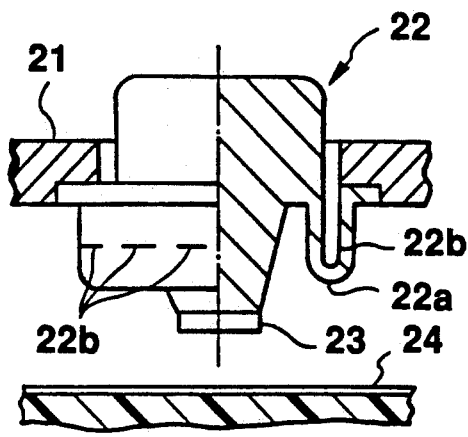
FIG. 6 is a vertical sectional view showing the non-manipulating state of the manipulation button of the waterproof camera in a second embodiment of the present invention.
Figure 7:
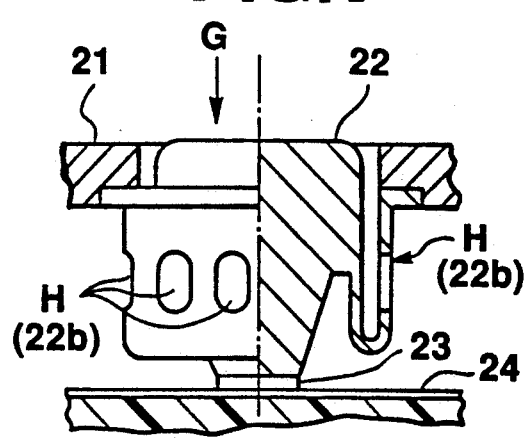
FIG. 7 is a vertical sectional view showing the manipulating state of the manipulation button of the waterproof camera of FIG. 6.

FIGS. 6 and 7 are sectional views of a manipulation button of the waterproof camera, showing a second embodiment of the present invention. FIG. 6 is a sectional view illustrating a non-manipulating state. FIG. 7 is a sectional illustrating a manipulating state. The waterproof camera in this embodiment is constructed as follows. The watertightness of the interior of the camera body is kept normally when a release button defined as a manipulation member or a T (telephoto)/W (wide-angle) changeover button or a zoom button is not manipulated. However, when the unillustrated lens tube is advanced and retracted by manipulating the above-mentioned respective manipulation buttons, a communication opening H serving as an air hole is formed with this pushing operation. The interior of the camera body or the lens tube is thereby brought into a communicative state with the outside air.

As illustrated in FIGS. 6 and 7, a manipulation button 22 may be the release button or the T (telephoto)/W (wide angle) changeover button or the zoom button and is a member composed of an elastic material such as a rubber. A flange portion thereof is fixedly bonded to the camera body 21. A thin film portion 22a assuming a U-shape in section is also formed between the button member and the flange. Further, a notch 22b (see FIG. 6) for holding the watertightness in a free state is formed in the thin film portion 22a along the periphery of the button member. This notch 22b is opened (see an opening H in FIG. 7) with a stretch of the thin film portion 22a when pushing manipulation button 22 in a direction G. Formed is an air hole through which the interior of the camera body or the lens tube communicates with the outside air. At the same time, the tip of the button member is provided with a contact point 23 of the conductive rubber. When depressing the button member, the contact point 23 contacts a switch conductor pattern of the flexible printed board 24 which is positioned opposite thereto. A relevant manipulation indicating signal is thereby outputted.

In the thus constructed waterproof camera in this embodiment, the button notch 22b is, as depicted in FIG. 6, not opened during the non-manipulation of the manipulation button 22. Therefore, the camera is held in the watertight state. Then, in the case of advancing and retracting the lens tube, the manipulation button 22 such as the release button or the T (telephoto)/W (wide-angle) changeover button or the zoom button is pushed in the direction G, the notch 22b is deformed enough to open. The air hole is thus formed. Hence, there is caused no fluctuation in the internal pressure due to the advancement and retraction of the lens tube.

Figure 8:
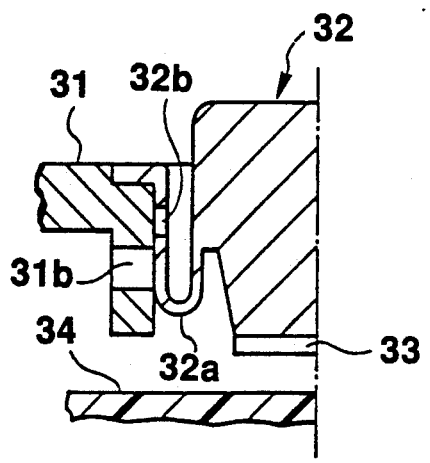
FIG. 8 is a vertical sectional view illustrating the non-manipulating state of the manipulation button of the waterproof camera in a third embodiment of the present invention.
Figure 9:
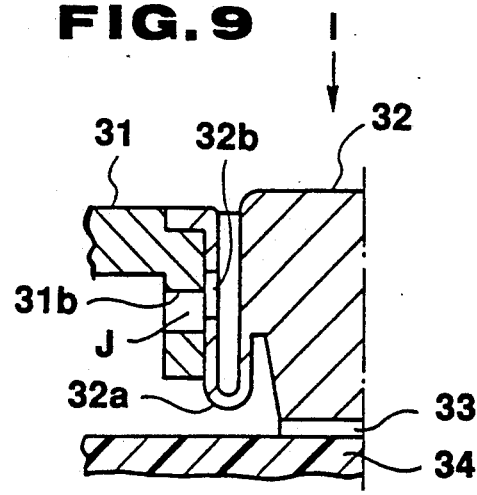
FIG. 9 is a vertical sectional view showing the manipulating state of the manipulation button of the waterproof camera of FIG. 8.

FIGS. 8 and 9 are sectional views of the manipulation button of the waterproof camera, showing a third embodiment of the present invention. FIG. 8 is a sectional view illustrating a non-manipulating state. FIG. 9 is a sectional view depicting a manipulating state. The waterproof camera in this embodiment is also constructed as in the same way with the second embodiment discussed above. When the manipulation member, i.e., the T (telephoto)/W (wide-angle) changeover button, etc. is not manipulated, the watertightness of the interior of the camera body is maintained. However, when advancing and retracting the unillustrated lens tube by pushing the respective buttons described above, an opening J serving as an air hole is formed with this pushing operation. The interior of the camera body or the lens tube is thereby communicated with the outside air.

As illustrated in FIGS. 8 and 9, a manipulation button 32 may be the T (telephoto)/W (wide-angle) changeover button, etc. and is a member composed of an elastic material such as a rubber. The flange portion thereof is fixedly bonded to a camera body 31. A thin film portion 32a assuming a U-shape in section is also formed between the button member and the flange. Further, a hole 32b is formed in the thin film portion 32a along the periphery of the button member. Moreover, the camera body 31 has a cylindrical member fitted with no gap to the thin film portion 32a including the hole 32b. This cylindrical member is formed with a hole 31b that does not confront the hole 32 of the manipulation button 32 and comes in a closed state (see FIG. 8). In the manipulating state where the manipulation button 32 is pushed in a direction I, the hole 31b overlaps with the hole 32b with a stretch of the thin film portion 32a, thereby forming the opening J (see FIG. 9). The interior of the camera body or the lens tube communicates with the outside air through this opening J. Note that the tip of the button is provided with a conductive rubber contact point 33. When depressing the button member, the contact point 33 contacts a switch conductor pattern of a flexible printed board 34 that is positioned opposite thereto. Outputted is a manipulation signal of the T (telephoto)/W (wide-angle) changeover or the like of the lens tube.

In the thus constructed waterproof camera in this embodiment, the state of FIG. 8 is retained during the non-manipulation of the manipulation button 32, and the opening J is not formed. Hence, the camera is kept in the watertight state. Then, when pushing the manipulation button 32 in the direction I for the above-mentioned T (telephoto)/W (wide-angle) changeover, etc., a state of FIG. 9 is developed. The opening J serving as the air hole is formed, with the result that no fluctuation in the internal pressure is caused due to the advancement and retraction of the lend tube.

Figure 10:
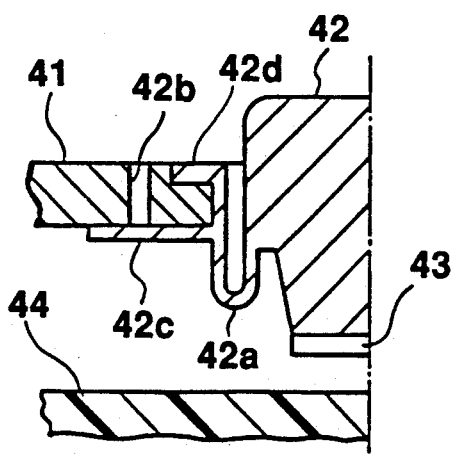
FIG. 10 is a vertical sectional view illustrating the non-manipulating state of the manipulation button of the waterproof camera in a fourth embodiment of the present invention.
Figure 11:
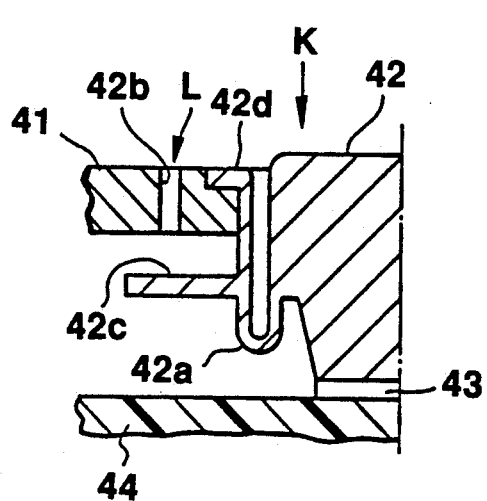
FIG. 11 is a vertical sectional view showing the manipulating state of the manipulation button of the waterproof camera of FIG. 10.

FIGS. 10 and 11 are sectional views of the manipulation button of the waterproof camera, showing a fourth embodiment of the present invention. FIG. 10 is a sectional view illustrating a non-manipulating state. FIG. 11 is a sectional view illustrating a manipulating state. The waterproof camera in this embodiment is also constructed in the same way as the second embodiment. Normally when the T (telephoto)/W (wide-angle) manipulation button, etc. defined as the manipulation button is not manipulated, the watertightness in the interior of the camera body is maintained. When advancing and retracting the unillustrated lens tube, the opening L serving as the air hole is formed with the pushing operation thereof. The interior of the camera body or the lens tube is communicated with the outside air.

As depicted in FIGS. 10 and 11, the manipulation button 42 may be the T (telephoto)/W (wide-angle) manipulation button, etc. and is a member composed of an elastic material such as a rubber. A first flange 42d thereof is fixedly bonded to a camera body 41. Further, a thin film portion 42a assuming a U-shape in section is formed between the button member and the first flange 42d. Moreover, the manipulation button includes a second flange 42c along the outer periphery of the thin film portion 42a. On the other hand, camera body 41 has a through-hole 42b formed outwardly of the bonding portion of the first flange. Then, in the non-manipulating state of the manipulation button 42, the through-hole 42b is in a closed state (see FIG. 10) where the second flange 42c contacts the through-hole 42b. When pushing the manipulation button 42 in a direction K, however, the thin film portion 42a stretches, thereby forming a gap between the camera body 41 and the second flange 42c. The through-hole 42b becomes the opening L defined as the air hole (see FIG. 11). Further, the button tip is provided with a conductive rubber contact point 43. When depressing the button, the contact point 43 contacts a switch conductor pattern of a flexible printed board 44 which is positioned opposite thereto. Outputted is a manipulation signal of the above-mentioned T (telephoto)/W (wide-angle), etc.

In the thus constructed waterproof camera in this embodiment, a state of FIG. 10 is retained during the non-manipulation of the manipulation button 42. The above-described opening L is not formed, and hence the camera is kept in the watertight state. Then, when advancing and retracting the lens tube by pushing the T (telephoto)/W (wide-angle) manipulation button, etc., the manipulation button 42 is pushed in a direction K. Thereupon, a state of FIG. 11 is developed, and the opening L serving as the air hole is formed. No fluctuation in the internal pressure due to the advancement and retraction of the lens tube is caused in the camera body or the lens tube.

As discussed above, the waterproof cameras in the second, third and fourth embodiments are also capable of preventing the variations in the internal pressure of the camera body or the lens tube due to the advancement and retraction of the lens tube that are executed with the manipulation of the manipulation button while normally retaining the watertightness without employing a filter or the like made of an expensive material as in the case of the first embodiment.

Figure 12:
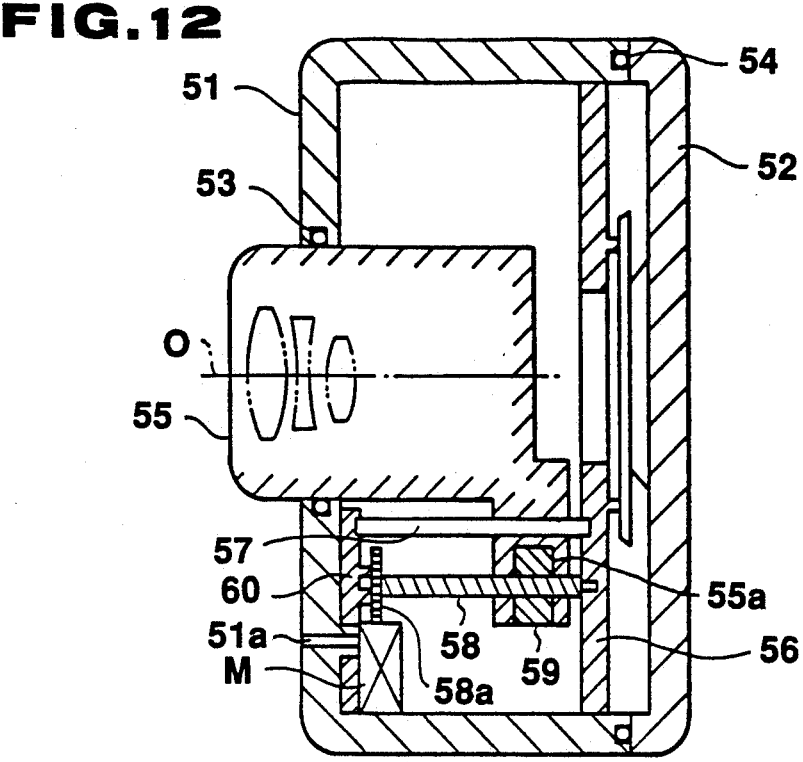
FIG. 12 is a vertical sectional view illustrating the principal portion of the waterproof camera in a fifth embodiment of the present invention.

FIG. 12 is a vertical sectional view of the waterproof camera, showing a fifth embodiment of the present invention. The waterproof camera in this embodiment is of a collapsible mount type; and the lens tube is advanced and retracted by focusing executed in accordance with a focusing indication or by resetting. In advance of a volumetric variation within the camera body due to the advancement and retraction thereof, and further during the volumetric variation, the change in the internal pressure of the camera body is prevented so as to permit the intermittent communication between the interior of the camera body and the outside air through an opening 51a serving as an air hole. In a state where a variety of actions are finished, the watertight state is kept by making it impossible to communicate the opening 51a with the outside air.

As shown in FIG. 12, the waterproof camera in this embodiment is constructed mainly of a camera body unit, a lens tube unit and a focusing detection unit M.

The camera body unit consists of a camera body 51 for slidably supporting a lens tube 55 while holding the watertight state through an O-ring 53; a rear cover 52 for providing the watertight state with respect to the camera body 51 by use of the O-ring 54; and a camera main frame 56 for mounting an unillustrated photographing mechanism. The camera body 51 is formed with the opening 51a for permitting the communication with the outside air.

Further, the lens tube unit is composed chiefly of: the above-mentioned lens tube 55 incorporating a photographing optical system; a suspension shaft 57, supported on the main frame 56 and a base plate 60, for guiding the lens tube 55 in optical-axis direction 0; a feed screw 58, similarly rotatably supported on the main frame 56 and the base plate 60, for effecting an advancing/retracting drive of the lens tube 55 for the focussing and resetting operations; and a nut 59 theradedly engaging with the feed screw 58 and caught by a moving member 55a of the lens tube in a stop-of-rotation state. In the lens tube unit, when rotating the feed screw 58 through a reduction gear by driving an unillustrated focusing motor, the lens tube 55 is selectively advanced and retracted in the optical-axis directions 0 along the suspension shaft 57 through the nut 59. Further, the feed screw 58 is fixedly mounted with a drive gear 58a for driving the focusing detection unit M.

Besides, the focusing detection unit M acts to detect a focusing drive position or a reset drive position with the aid of a photo interrupter (hereinafter abbreviated to PI) and outputs a signal thereof to an unillustrated control circuit. On the other hand, the opening 51a is invariably brought into the closed state both in the operation to form the air hole by intermittently opening the opening 51a during the focusing or resetting drive and in a state where the focusing or resetting drive is finished. Performed is the control to keep the camera body 51 in the watertight state.

Figure 13:
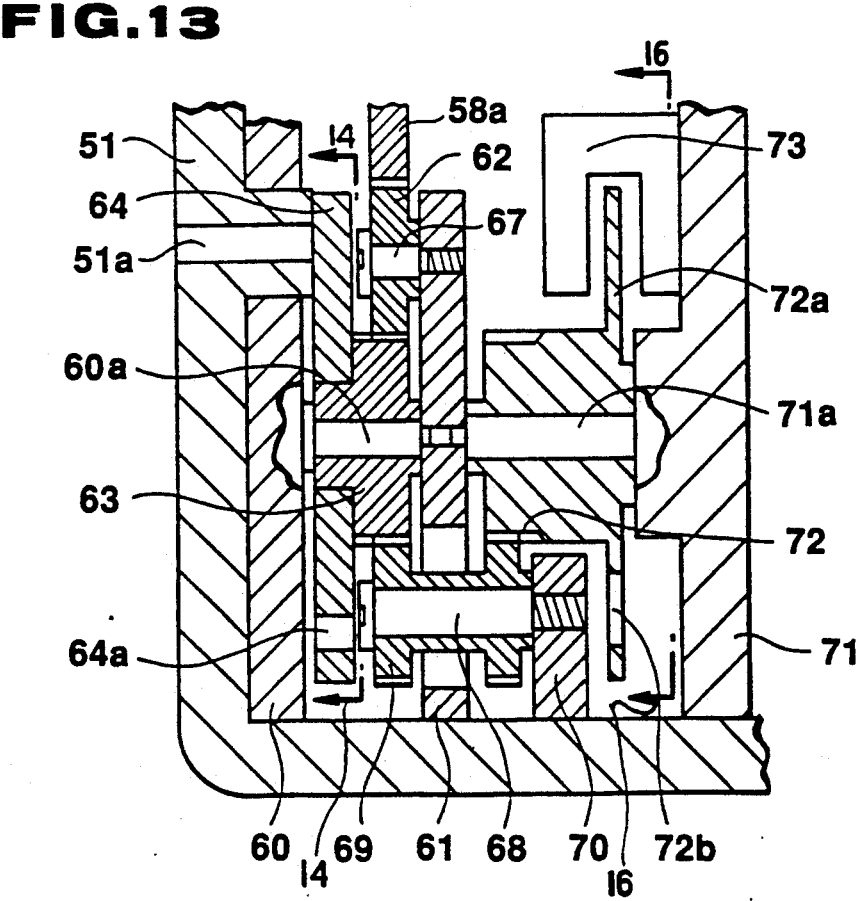
FIG. 13 is an enlarged sectional view illustrating a focusing detection unit of the waterproof camera of FIG. 12.
Figure 14:
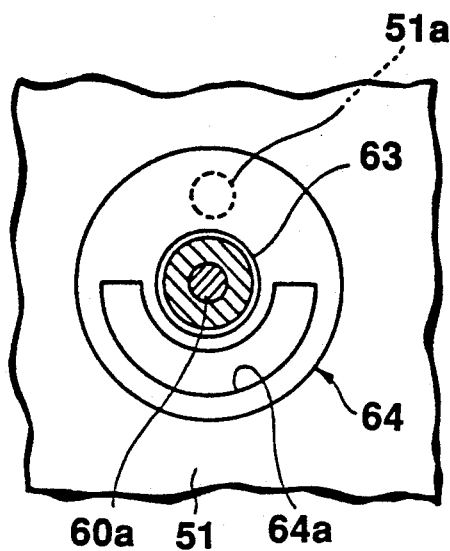
FIG. 14 is a sectional view taken substantially along the line 14—14 of FIG. 13 in a closed state of an opening of a rubber plate.
Figure 15:
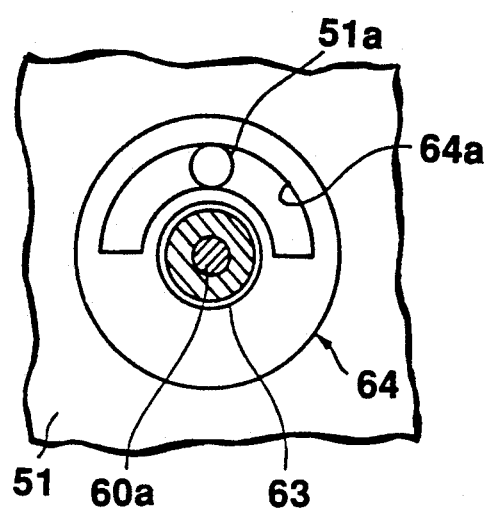
FIG. 15 is a sectional view taken substantially along the line 14—14 of FIG. 13 in an open state of the opening of the rubber plate.

The construction thereof will be explained. FIG. 13 is an enlarged sectional view of the detection unit M. The above-mentioned drive gear 58a rotationally drives a gear 63 axially supported on a shaft 60a through an idler gear 62 axially supported on a pin 67. A rubber plate 64 is fixed to the gear 63. This rubber plate 64 is formed with a semi-circular elongate hole 64a in a radius-of-gyration position which confronts the opening 51a. Hence, the opening 51a is intermittently opened and closed with gyrations of the rubber plate 64. Referring to FIGS. 14 and 15, FIG. 14 illustrates a case where the interior of the camera body is in the watertight state with the opening 51a being closed, while FIG. 15 shows a case where an air flow path is formed with the opening 51a being opened, and the interior of the camera body communicates with the outside air.

Figure 16:
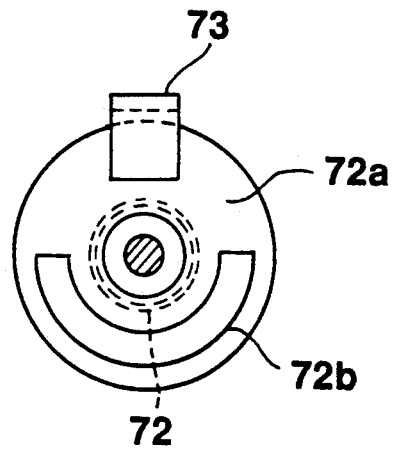
FIG. 16 is a sectional view taken substantially along the line 16—16 of FIG. 13, illustrating a photo interrupter.

The rotations of the gear 63 described above are transmitted to a gear 72 having a shield plate 72a via an idler gear 69 axially supported on a pin 68. A rotational angle of this gear 72 is the same as that of the gear 63. The shield plate 72a is, as depicted in FIG. 16, formed with an elongate hole 72b in its semi-circular portion. A rotational phase thereof is detected by PI 73 fixed to a base plate 71. Then, a phase in which PI 73 confronts the elongate hole 72b—i.e., an on-phase of the output of PI 73—coincides with a phase in which the elongate hole 64a of the rubber plate 64 confronts the opening 51a, viz, a phase in which the opening 51a is opened. Inevitably, the on-phase of the output of PI 73 coincides with the phase in which the opening 51a is opened. Hence, the opening/closing states of the opening 51a *are detectable from the output of PI 73.*

Note that the above-stated pin 67 and shafts 60a, 71a are supported on the base plate 61, etc., and the pin 68 is supported on a support plate 70.

Figure 17:
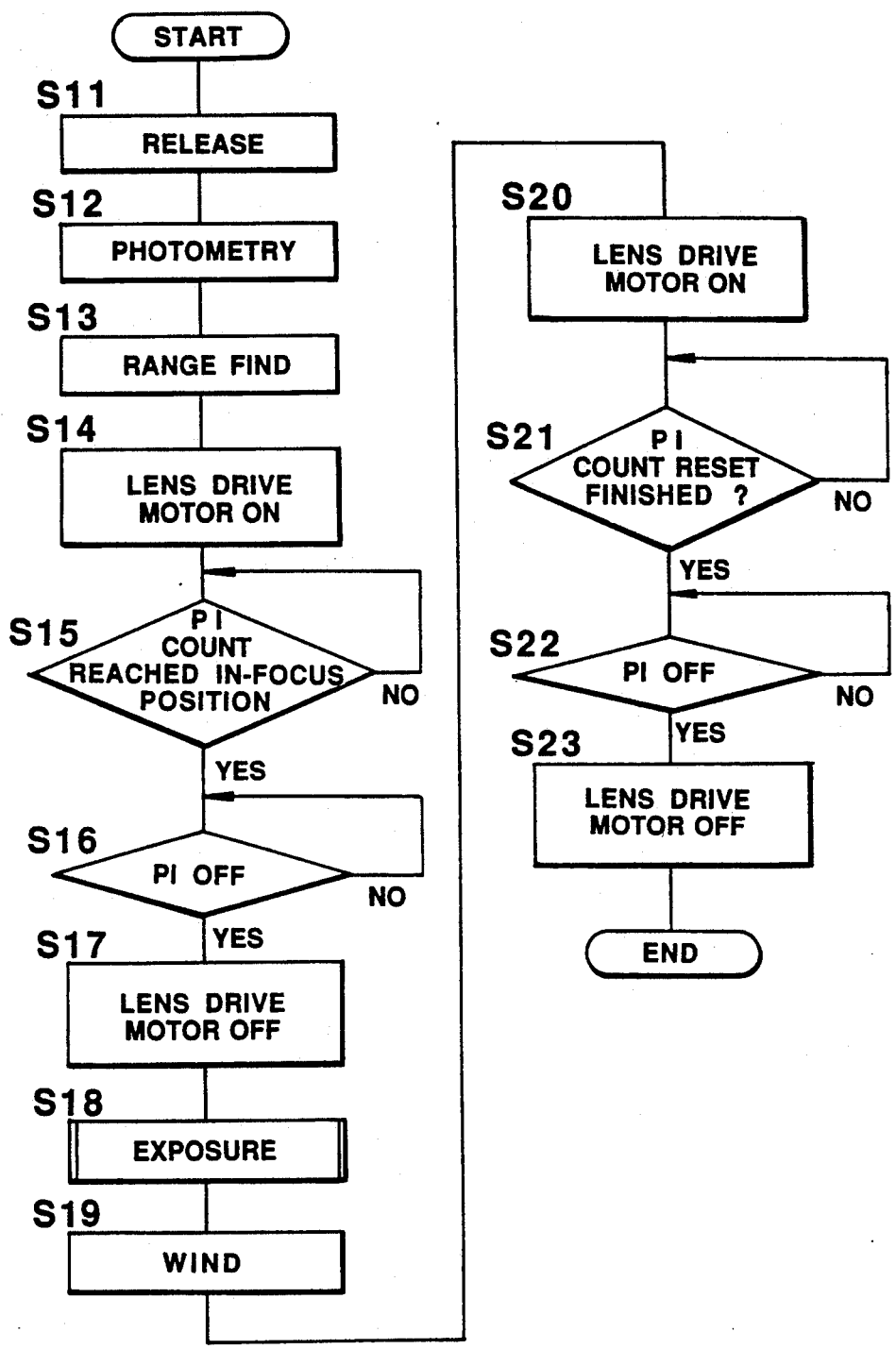
FIG. 17 is a flowchart showing a sequence of photographing processes of the waterproof camera.

Explained with reference to a flowchart of FIG. 17 are a photographing operation of the thus constructed waterproof camera in this embodiment and the opening/closing operations of the opening 51a.

In an initial state, the opening of the camera body 51 is closed, while the camera body is kept in the watertight state in the present camera. To begin with, photometric and range-finder operations are executed (steps S12, S13) with turn-on of the release switch defined as a manipulation member (step S11). Subsequently, the lens drive motor is actuated to rotate the feed screw 58, thus starting the drive of the lens tube 55 from a reset position to a in-focus target position (step S14). The rubber plate 64 gyrates during this driving operation. The opening 51a is intermittently opened to form the air hole. Hence, there is caused no fluctuation in the internal pressure of the camera body 51 due to the feed-out of the lens tube. Confirmed in step S15 is the fact that a pulse count value of PI 73 reaches a value corresponding to the in-focus position. The action moves to step S16. Then, whether the output of PI 73 is off or not is checked. If not off, i.e., if the opening 51a is not closed, the feed screw 58 is slightly rotated to close the opening 51a. The action proceeds to step S1. This confirmation is effected based on the output of PI 73. Further, this slight rotation is set as a quantity within a half-circular on the rubber plate 64 and is made through an angle small enough so as not to cause a problem in terms of resolving power in the in-focus position. In step S17, the lens drive motor is turned off to stop the lens tube 55 in the in-focus target position. An exposing operation is executed (step S18), and a wind-up for one frame is performed (step S19). Subsequently, the lens drive motor is restarted, thus starting the feed-out of the lens tube 55 up to the in-focus position/reset position (step S20). The rubber plate 64 gyrates during this driving operation. The opening 51a is intermittently opened. Hence, there is caused no fluctuations in the internal pressure of the camera body 51 due to the feed-out of the lens tube. In step S21, after confirming that the pulse count value of PI 73 has reached the value corresponding to the reset position, the action moves to step S22. Checked is whether or not the output of PI 73 is off. If not off, i.e., if the opening 51a is not closed, the feed screw 58 is slightly rotated to close the opening 51a. The action proceeds to step S23. Then, the lens drive motor is turned off, and the photographing sequence comes to an end.

In the waterproof camera in accordance with this embodiment, as described above, it is possible to automatically prevent the occurrence of variation in the internal pressure of the camera body which is derived from the advancement and retraction of the lens tube 55 by opening and closing the opening 51a in association with the focusing operation. Therefore, the camera is extremely easy to use because of no necessity for photographing while the user pays special attention to the watertightness. Note that the waterproof camera in this embodiment controls opening/closing of the opening 51a in association with the focusing operation, but, as an example of variant form, opening/closing of the opening 51a may be controlled in connection with a zooming operation.

Figure 18:
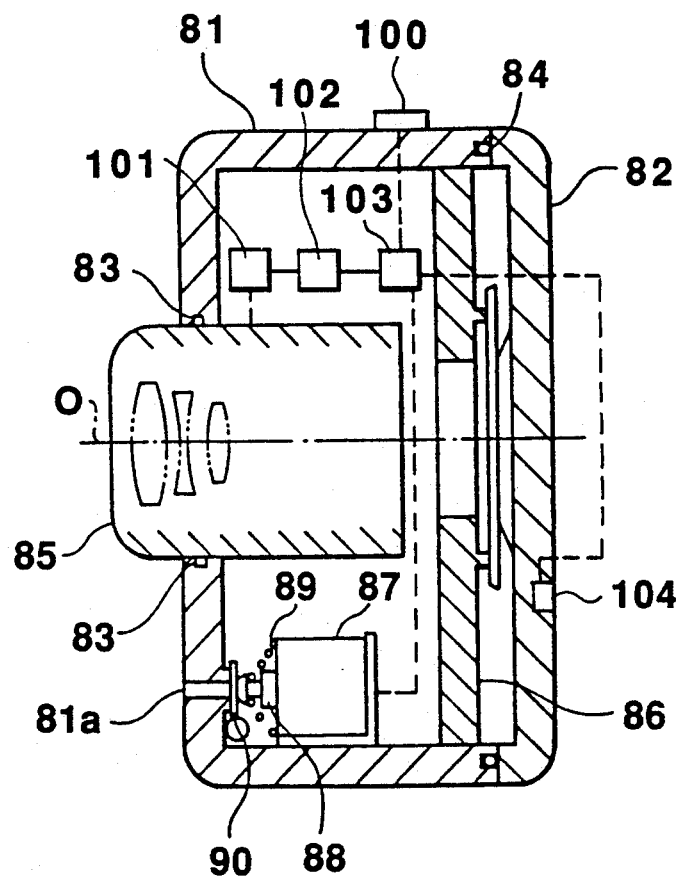
FIG. 18 is a sectional view illustrating the principal portion of the waterproof camera in a sixth embodiment of the present invention.

The following is an explanation of the waterproof camera in a sixth embodiment of the present invention with reference to FIG. 18.

The waterproof camera in this embodiment is constructed such that the air hole is formed prior to the advancement and retraction of the lens tube on the basis of an operation signal of the focusing indication, and thereafter the air hole is closed after finishing the reset operation of the lens tube.

As illustrated in FIG. 18, a lens tube 85 of the present camera is so supported on a camera body 81 through an unillustrated mechanism of a camera main frame 86 as to be advanceable and retractable in the optical-axis direction O while keeping the watertightness with an O-ring 83. This camera body 86 is kept in the watertight state with a rear cover 82 through an O-ring 84. The above-mentioned camera body 81 has an opening 81a, and a rubber sheet valve 90 is disposed facing to an inner surface side of the opening 81a. This sheet valve 90 itself is biased anticlockwise by an unillustrated spring member. Further, a solenoid 87 is disposed to the rear of the sheet valve 90. During an off-time of the solenoid, a movable core 88 is biased by a return spring 89 to thrust the valve 90 to the left relative to FIG. 18. In this state, the above-mentioned opening 81a is closed, while the camera body 81 is kept in the watertight state. Besides, when the solenoid is turned on, the movable core 88 is attracted, whereby the sheet valve 90 is retreated clockwise by its biasing force. The opening 81a is put into the open state to form the air hole.

A control circuit 103 executes at least one of the following respective operations. Namely, (1) for a time when a manipulation member, i.e., a release button or zoom button, is pushed, or for a predetermined time since it has been pushed, the air hole is opened by operating the solenoid 87;

(2) when a load detection circuit 102 detects that a lens drive circuit 101 indicates a predetermined amount of load or greater, the air hole is opened by operating the solenoid 87 for a predetermined time;

(3) when a temperature sensor 104 detects a temperature difference having a predetermined aforesaid value or larger, a air hole is opened by operating a solenoid 87 for the predetermined time; and (4) when the lens drive circuit 101 indicates an end of drive, the air hole is opened by operating the solenoid 87 for a predetermined time.

In the thus constructed waterproof camera in this embodiment, the solenoid 87 is kept in an off-state before the photographing operation is carried out. The opening 81a is closed, and the camera body 81 is kept in the watertight state. Then, when depressing an unillustrated shutter release button, viz., a manipulation member, the solenoid 87 is turned on prior to the advancement and retraction of the lens tube 85, i.e., the volumetric variation within the camera body 81. The movable core 88 is thereby attracted, and the sheet valve 90 is retreated. The opening 81a is therefore brought into the open state. The camera body 81 communicates with the outside air to form the air hole. In this state, a lens tube 83 is driven, and focusing is executed. Subsequently, after the lens tube has been reset-driven with executions of exposure and winding-up, i.e., after the volume has changed, or after winding-up has been effected, the solenoid 87 is turned off. The camera body reverts again to the initial watertight state, thus finishing the photographing.

As discussed above, the waterproof camera in this embodiment is capable of automatically preventing fluctuations in the internal pressure of the camera body in association with the release operation with a simpler construction. In this embodiment also, it is possible to control opening/closing of the opening 81a by relating it to not only the focusing operation but also, as an example of variant form thereof, the zooming operation.

Although the illustrative embodiment of the present invention have been described in detail with reference to the accompanying drawings, it is to be understood that the present invention is not limited to those embodiments. Various changes of modifications may be effected by one skilled in the art without departing from the scope or spirit of the invention.

What is claimed is:

1. A waterproof camera comprising:
a lens tube advanceable and retractable in direction of an optical axis;
a camera body for slidably supporting said lens tube in a watertight state; and
a manipulation member, provided on one of said lens tube and said camera body, for causing said lens tube to advance and retract when manipulated and substantially simultaneously forming an air hole through which an interior of said lens tube or said camera body communicates with the outside air in relation to said manipulation.

2. The waterproof camera claimed in claim 1, wherein said manipulation member is disposed to contact a seal of a rubber or like material which is fixed to one of said lens tube and said camera body, a part of said seal in contact therewith being separated therefrom when manipulated, and an air hole is thereby formed.

3. The waterproof camera claimed in claim 1, wherein a portion of said manipulation member is comprised of an elastic material such as rubber, and an air hole is formed in said manipulation member when manipulated.

4. The waterproof camera claimed in claim 1, wherein a first air hole is formed in one of said lens tube and said camera body, said manipulation member including a watertight portion for closing said first air hole and a second air hole, and said manipulation member also forming an air hole through which one of said lens tube and said camera body communicates with the outside air by aligning said watertight portion opposite to said first air hole during a non-manipulation and aligning said second air hole opposite to said first air hole during a manipulation.

5. The waterproof camera claimed in claim 1, wherein said manipulation member, which is composed of an elastic member such as a rubber, normally closes an air hole formed in one of said lens tube and said camera body, and closing of said air hole is released when manipulated.

6. A waterproof camera comprising:
a lens tube capable of advancing and retracting along an optical axis;
a camera body for slidably supporting said lens tube in a watertight state;
a manipulation member, provided on one of said lens tube and said camera body, for selectively causing said lens tube to advance and retract; and
an air hole for directly communicating an interior of one of a lens tube and camera body with surrounding air, which air hole is intermittently formed by a member operated during one of the advancement and retraction of said lens tube.

7. The waterproof camera claimed in claim 6, further comprising a drive mechanism for advancing and retracting said lens tube and a control unit for controlling the advancement and retraction of said lens tube.

8. A waterproof camera comprising:
a lens tube capable of advancing and retracting along an optical axis;
a camera body for slidably supporting said lens tube in a watertight state;
a manipulation member, provided on one of said lens tube and said camera body, for selectively causing said lens tube to advance and retract;
an air hole intermittently formed by a member operated during one of the advancement and retraction of said lens tube;
a drive mechanism for advancing and retracting said lens tube and a control unit for controlling the advancement and retraction of said lens tube; and
said control unit for controlling the advancement and retraction of said lens tube including means for detecting if said air hole is open or closed.

9. A waterproof camera comprising:
a lens tube capable of advancing and retracting along an optical axis;

a camera body for slidably supporting said lens tube in a watertight state;

an air hole provided in one of said lens tube and camera body;

a manipulation member provided on said lens tube or said camera body and associated with the advancement and retraction of said lens tube; and a means for opening said air hole before starting the advancement and retraction of said lens tube and closing said air hole after at least one of the advancement and retraction thereof is completed.

10. The waterproof camera claimed in claim 9, wherein said manipulation member is made to deviate from the constrictive requirements thereof.

11. The waterproof camera claimed in claim 9, further comprising a drive mechanism for advancing and retracting said lens tube, a control unit operating said drive mechanism for controlling the advancement and retraction of said lens tube and a control unit for said air hole opening/closing means.

12. In a waterproof camera constructed of a camera main frame and a lens barrel movably provided in said camera main frame in a watertight state, the improvement characterized by comprising:

a through-hole formed in one of said camera main frame and said lens barrel for communicating an interior or one of said lens barrel and said camera body to surrounding outside air;

a closing member for closing said through-hole;

a driving means for operating said closing member in such a direction as to open through-hole; and a control means for operating said driving means.

13. The waterproof camera claimed in claim 12, wherein said control means responds to a manipulation member for driving said lens barrel.

14. The waterproof camera claimed in claim 12, wherein said control means responds to a manipulation member for starting a photographing operation.

15. The waterproof camera claimed in claim 12, wherein said control means responds to a variation in ambient temperature to operate said driving means.

16. The waterproof camera claimed in claim 12, wherein said control including means which responds to a predetermined load of a lens barrel drive device during a movement of said lens barrel to operate said driving means.

17. The waterproof camera claimed in claim 12, wherein said control means responds to an end of movement of said lens barrel to operate said driving means.

18. In a waterproof camera in which a volume of air contained therein varies with an advancement and retraction of a lens barrel;

the improvement characterized in that a manual manipulation means mounted on one of said camera and lens barrel for controlling driving of said lens barrel includes an air communicating means for permitting communication of air between an exterior and an interior of one said camera and lens barrel; and said manipulation means including means which forms a hole through which said air communicating means prevents air communication when said manipulation means is not manipulated and permits air communication only when said manipulation means is manipulated.

19. In a waterproof camera in which a volume of air contained therein varies with an advancement and retraction of a lens barrel;

the improvement characterized in that a manual manipulation means for controlling driving of said lens barrel includes an air communicating means for permitting communication of air between an exterior and an interior of one said camera and lens barrel;

said manipulation means including means which forms a hole through which said air communicating means prevents air communication when said manipulation means is not manipulated and permits air communication only when said manipulation means is manipulated; and said manual manipulation means being comprised of an elastic member and having a slit-like notch which forms an air hole, and a communication path is thus formed.

20. The waterproof camera of claim 3, wherein said manipulation member is provided with a slit which is maintained closed when said manipulation member is at rest and which opens due to a stretching of the manipulation member when manipulated to open said slit;

a natural resilience of said manipulation member returning the manipulation member to the rest state when the manipulation member is released.

21. The waterproof camera of claim 3 further comprising:

switch means including first and second terminals displaced from one another and arranged in the camera body opposite said manipulation member; and a conductive member mounted on said manipulation member for engaging said first and second terminals when the manipulation member is manipulated and being displaced from at least one of said terminals when the manipulation member is released.

22. The waterproofing camera of claim 21 wherein said conductive member is formed of a conductive rubber.

23. A method for operating a water-proof camera comprising a camera body having a lens barrel movably mounted thereon so as to maintain a water-tight condition, said method comprising the steps of:

(a) operating a manipulation button on the camera to initiate a photographing operation;

(b) determining the range of an object to be photographed responsive to operation of the manipulation member;

(c) driving the lens barrel to a focussed position responsive to the range value;

(d) intermittently and repetitively enabling ambient air to directly communicate within an interior of one of a camera body and lens barrel by intermittently and repetitively sealing and unsealing an opening in one of the camera body and lens barrel responsive to driving of said lens barrel; and (e) terminating the drive of said lens barrel when the focussed condition is reached.

24. The method of claim 23 further comprising the steps of:

(f) halting the operation of intermittently allowing ambient air to communicate with the interior of one of the camera body and lens barrel when said focussed condition is obtained;

(g) determining if the state of permitting ambient air to communicate with the interior of one of the camera body and lens barrel has been maintained after said lens barrel has been halted when in the focussed condition; and (h) operating a motor controlling the sealing and unsealing step (c) for an interval sufficient to change from the state during which said opening is unsealed to a state where said opening is sealed.

25. The method of claim 24 wherein said camera further comprises a movable member for sealing said opening during said sealed state and unsealing said opening when in the unsealed state, wherein step (h) further comprises the step of operating said motor for an interval sufficient to move said movable means to a position sealing said opening.

* * * * *

UNITED STATES PATENT AND TRADEMARK OFFICE
CERTIFICATE OF CORRECTION

PATENT NO. : 5,298,928
DATED : March 29, 1994
INVENTOR(S) : Tatsuya Suzuki; Shunji Matsutani It is certified that error appears in the above-indentified patent and that said Letters Patent is hereby corrected as shown below:

Column 4, line 19, after the word "pushing" insert "the".
Column 4, line 24, after the word "of" delete "the".

Column 6, line 46, after the word "of" delete "the".
Column 6, line 49, after the word "permitting" delete "the".
Column 6, line 59, change the word "theradedly" to "threadedly".
Column 8, line 4, change the words "half-circular" to "half-rotation".
Column 9, line 15, after the word "predetermined" delete "aforesaid".
Column 9, line 16, after the word "larger," delete "a".
Column 9, line 17, after the word "operating" delete "a".
Column 9, line 16, after the word "the" insert "aforesaid".

UNITED STATES PATENT AND TRADEMARK OFFICE
CERTIFICATE OF CORRECTION

PATENT NO. : 5,298,928
DATED : March 29, 1994
INVENTOR(S) : Tatsuya Suzuki, Shunji Matsutani It is certified that error appears in the above-indentified patent and that said Letters Patent is hereby corrected as shown below:

Column 11, claim 12, line 27, change the word "or" to "of".

Signed and Sealed this

Twenty-seventh Day of September, 1994

Attest:

BRUCE LEHMAN

Attesting Officer     Commissioner of Patents and Trademarks